United States Patent [19]
Farkas

[11] Patent Number: 4,827,152
[45] Date of Patent: May 2, 1989

[54] UNINTERRUPTIBLE POWER SUPPLY SYSTEM

[76] Inventor: Otto Farkas, 5848 Streamview Dr. #36, San Diego, Calif. 92105

[21] Appl. No.: 182,543

[22] Filed: Apr. 18, 1988

[51] Int. Cl.⁴ .............................................. H02J 9/06
[52] U.S. Cl. ..................................... 307/68; 290/4 R; 290/52; 322/9; 307/67
[58] Field of Search ................. 307/67, 68, 78, 83, 307/84, 85, 86, 87, 57; 322/9, 28, 20, 27, 38, 40, 37, 46; 290/1 R, 1 A, 2, 4 R, 4 A, 4 C, 4 D, 52; 318/140, 141, 142, 143, 144, 145, 146, 147, 148, 149, 150, 151, 152, 153, 154, 155, 156, 157, 158, 159, 160; 60/711, 618; 310/102 R, 103

[56] References Cited

U.S. PATENT DOCUMENTS

| | | | |
|---|---|---|---|
| 3,230,381 | 1/1966 | Grinnell et al. | 290/52 |
| 3,458,710 | 7/1969 | Dodge | 290/4 R |
| 3,665,495 | 5/1972 | Carter et al. | 290/4 R X |
| 3,675,112 | 7/1972 | Smith | 290/4 R X |
| 3,699,351 | 10/1972 | Addie | 290/52 X |
| 3,864,965 | 2/1975 | Anderson | 318/154 X |
| 4,010,378 | 3/1977 | Tharpe et al. | 290/2 |
| 4,158,145 | 6/1979 | Kartsounes et al. | 290/52 |
| 4,203,041 | 5/1980 | Sachs | 307/68 X |
| 4,439,720 | 3/1984 | Georges | 322/9 X |
| 4,525,661 | 6/1985 | Mucsy et al. | 322/9 X |

Primary Examiner—William M. Shoop, Jr.
Assistant Examiner—Paul Ip
Attorney, Agent, or Firm—Charmasson & Holz

[57] ABSTRACT

An uninterruptible rotating power supply incorporates a sensor of motion and distortion of a stator during interruptions of normal power supply acting on the stator within a synchronous motor, which normally rotates an alternator supplying power to the electric load. When a distortion (unacceptable normal power supply) is sensed, transient power is supplied by a flywheel and hydraulic motor driven by hydraulic fluid stored under pressure in a reservoir. Long term emergency power is supplied by a diesel engine driving the generator or hydraulic pump. The dual supply of transient power allows redundancy for large amperage critical applications or downsizing of flywheel to minimum levels in less critical applications or where a portion of the load is not critical.

12 Claims, 2 Drawing Sheets

UNINTERRUPTIBLE POWER SUPPLY SYSTEM

FIELD OF THE INVENTION

This invention relates to electric power generation, more specifically to stand-by and uninterruptible electric power generation systems.

BACKGROUND OF THE INVENTION

The primary objectives of an uninterruptible electric power supply system are to: (1) sense normal power supply interruption, failure or inadequacy, (2) upon interruption, switch electric power supply to a standby and/or emergency supply, and/or switch loads from normal to emergency or limited loads (within the capability of the stand-by or emergency supply), (3) provide long term standby or emergency power until normal power supply is again available, and (4) provide transitional power and control during the period between loss of normal power and stand-by or emergency supply. Other useful functions include removing of unwanted spikes or transients from the normal power supply, power-factor correction, and monitoring/alarm to notify of the loss and/or operation of the uninterruptible supply.

The uninterruptible power supply should be small so that it will not occupy valuable space or interfere with normal functions, capable of convenient testing to verify emergency capability, be able to operate for extended periods of failure of the normal power supply and low in cost. It should also be light weight, rugged in construction, and low in cost. When the system is used to remove transients or during testing, a minimum of effort to convert from one mode of operation/test to another mode is also desirable.

Most of the current uninterruptible power supplies may do one of these objectives well, but others poorly or not at all. These limitations may be acceptable in many applications, but are unacceptable in some critical applications, such as hospitals or large computer installations. Many of these critical applications have multiple standby and/or emergency systems to achieve acceptable performance and reliability.

One type of uninterruptible power supply uses a large motor generator set with a large flywheel. This can also function as normal (electric power only or cogeneration) as well as standby electric power. The flywheel provides a short (transition) period of energy storage when power is lost, allowing control and switching to a stand-by unit. A common variation of this approach is to add a motor to the engine generator set. The motor, supplied by normal power supply, such as a public utility, drives the generator under normal conditions. When normal power is interrupted, the kinetic energic stored in the flywheel provides sufficient transitional power until the engine (typically a combustion engine) can be started. The combination also isolates the load from the normal power supply's transients and shortens the transition time by eliminating the time required to bring the standby generator up to synchronous speed. However, power-failure sensing switch response and startup time are still significant, requiring substantial amounts of energy to be stored in the flywheel. Units tend to be very heavy because of the flywheel mass, complex and cumbersome, limiting transport, installation, access and use.

Sensing of power interruption and switching of these rotating uninterruptible power supply systems has been accomplished by power and/or current relays, current limiters, under and over frequency relays, leading/lagging power phase detectors, and excessive vibration detectors. These types of sensors/switches are capable of handling large currents/amperage, but are relatively slow, requiring the heavy flywheels or other measures to supply transient power. Resetting procedures for these devices can also create the need for extended storage even if normal power is restored, unless reset provisions are included.

Another approach is to provide battery storage. An inverter can be used to convert the dc battery power to ac power. A further modification allows continuous conversion and charging of the battery during normal operation and battery discharge during charging interruptions, also isolating the loads from transients in the normal power supply. A major advantages of the battery type of system is the quick response to normal power interruptions and reset provisions. However, battery systems become very large and costly for storing significant amounts of power for extended outages. They also suffer from round trip electrical power conversion losses (ac to dc to ac). energy. The output waveform of the inverter contains many spikes and harmonics which make it unsuitable for many applications.

Combinations of battery powered equipment and motor generator sets have also been used. These multi-component systems try to take advantage of the best aspects of battery storage (i.e.: quick response) with the best aspects of rotating equipment (i.e.: long term outage capability). Other combinations of storage and standby units are also known.

However, these prior multi-mode approaches have many limitations. These limitations are primarily related to the multiplicity of elements required to accomplish the operating modes, creating added cost, weight and space. This multiplicity of elements does provide some dual capability, but during many critical times, only one of the component subsystems can supply the electric load. This particularly adversely affects reliability that is a key goal, especially in critical applications. In addition, some of these combined systems require frequent and separate types of maintenance from two separate organizations.

What is needed is a rotating electric power supply system capable of quickly providing a transient as well as long term source of motive power without interruption to critical loads and without a massive flywheel or separate battery/power conditioning system.

SUMMARY OF THE INVENTION

The principal and secondary objects of the invention are:

To provide a quick reacting electric power sensor/switch in a rotating uninterruptible power supply;

To provide a reliable dual source of rotational energy to supply transitional power until longer term supply can be started; and To provide a system which can segregate and supply critical and noncritical loads during interruptions of normal power supply.

These and other objects are achieved by mounting a motor in a manner which allows the stator limited movement or distortion, combined with a sensing of unacceptable movement/distortion of a stator during interruptions of normal power supply and switching power from the source which normally rotates a generator supplying power to the electric load. When an unacceptable motion/distortion is sensed indicating unacceptable properties of the primary source of power, transient power is supplied by a flywheel and a hydraulic motor driven by a stored hydraulic fluid. Long term emergency power is supplied by a diesel engine driving the generator or hydraulic pump. The dual supply of transient power allows redundancy for large amperage critical applications and downsizing of flywheel to minimum levels in less critical applications or where a portion of the load is not critical. Option for dual supply of long term power source is also provided by engine and hydraulic pump supplying the hydraulic motor.

DESCRIPTION OF THE PREFERRED EMBODIMENT

Figure 1:
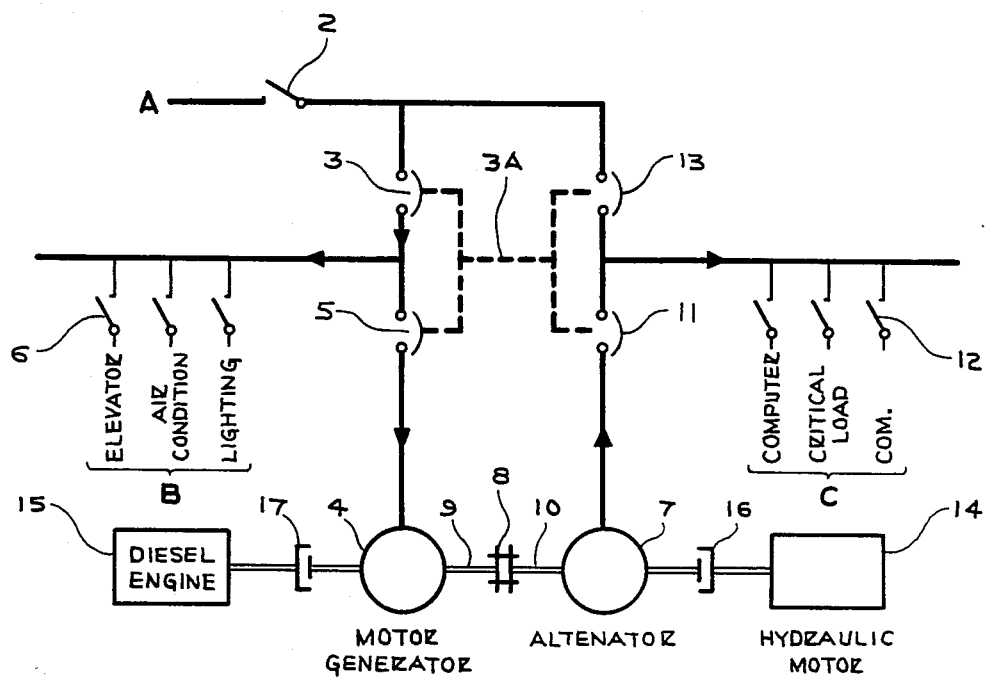
FIG. 1 shows an electrical schematic of a standby system.

FIG. 1 is a one-line electrical schematic of the preferred embodiment in the standby mode. A first or primary electrical power supply A that is normally provided by a public utility is drawn through main breaker 2 and normally closed first control switch 3. The normal power supplies both motor-generator 4 through normally closed second control switch 5 and non critical electric loads B through first circuit breakers 6. Non-critical loads may include air conditioning, portions of area lighting and other miscellaneous loads. First and second control switches 3, 5 can be opened by a solenoid actuator 3A. If non-critical loads are not to be served during a primary power outage, the control switches and the solenoid actuator can be closed manually when primary power is restored. Control switch 5 can also be closed automatically if sufficient motive power is available to the motor-generator 4 to supply the non-critical loads during outage of primary power.

The motor-generator 4 acts as a motor when the primary source of power from the main breaker 2 is applied, rotating an alternator or generator 7 through a drive axle equipped with a small flywheel 8. The small flywheel 8 is attached to rotating elements 9 and 10 of the motor and generator drive axle. The flywheel 8 is sized to generally maintain the rotating speed of the rotating members (rotors) during very short, momentary periods of time. The flywheel 8 in another configuration may be larger and sized to generally maintain rotating speed during longer periods. The alternator 7 supplies power isolated from the primary supply. This isolated power supplies the critical loads C through the normally closed third control switch 11 and second circuit breakers 12. Critical loads may include: hospitals; clinics; life support systems (i.e.: tunnels and closed chambers); military installations; land, air and sea borne traffic control installations; critical manufacturing processes; nuclear facilities; large banking or other computer installations; large building elevators; emergency lighting; and other loads where loss of power can be life-threatening or damaging.

A normally open fourth control switch 13 is included in the preferred embodiment, which when second control switch 5 is opened, allows normal power source from the main breaker 2 to supply critical as well as non-critical loads in the event of failure, testing, or maintenance of motor 4 and/or alternator 7. However, other embodiments such as manual breakers could be substituted for the fourth control switch 13.

The motor 4 is slidably or flexibly mounted on rubber or other similar material mounting pads, allowing limited motion and deformation of stator. Slight deformation and motion between the stator and rotor occur in reaction to changing magnetic forces during changes in primary power supply voltage, waveform or phase angles. An alternate embodiment would flexibly mount motor and alternator.

When an interruption or other unacceptable condition of the normal or primary source of power from the main breaker 2 is sensed, first control switch 3 is opened and hydraulic motor 14 is actuated along with a starting sequence given to diesel or other combustion engine 15. Hydraulic motor 14 drives the alternator 7 and motor 4 through a ratchet clutch 16 or other clutch which allows the hydraulic motor to provide motive power but does not allow drive of the hydraulic motor by the motor alternator assembly. The hydraulic motor 14 is selected to require a very short (momentary) period of time to begin providing motive power at speed. During this momentary period, flywheel 8 generally provides additional rotating mass to maintain the rotating speed of the members 9 and 10. In other embodiments, the rotating mass of members 9 and 10 is sufficient to generally maintain rotating speed without the addition of a flywheel. Other embodiments would also include a clutch at the flywheel 8, in order to further segregate non critical from critical loads and further reduce the motive power required by the hydraulic motor 14.

The combustion engine 15 drives the motor 4 and generator 7 through a second ratchet clutch 17 or other type of clutch which only allows motive power to be transferred from, and not to, the engine A longer period of time is required prior to the combustion engine beginning to provide motive power. When the combustion engine 15 is transferring motive power, the hydraulic motor may be disengaged at clutch 16 or the supply of hydraulic fluid interrupted or allowed to decay, transferring the source of motive power to the combustion engine 15.

Figure 2:
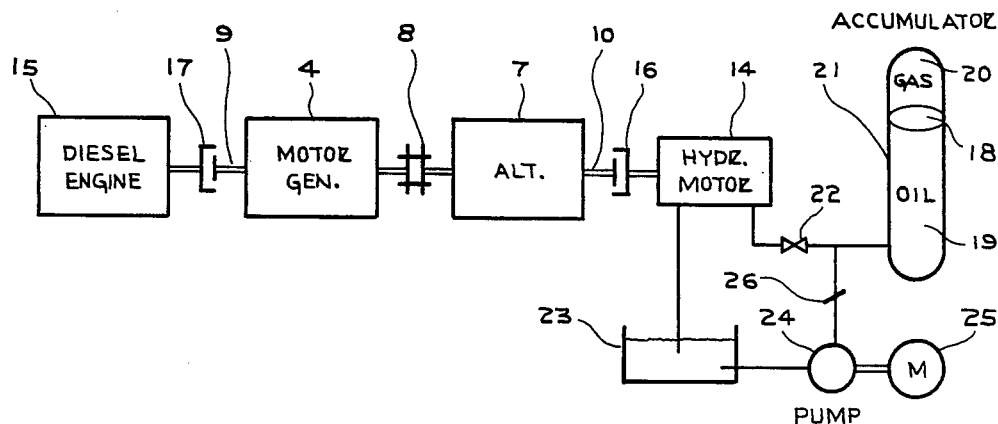
FIG. 2 shows a mechanical schematic of a standby system.

FIG. 2 is a mechanical schematic of the preferred embodiment of an uninterruptible power supply system. The combustion engine 15 provides the primary source of long term emergency electrical power to the critical loads by rotating (driving) alternator through second ratch clutch 17, motor 4 and flywheel 8. During this period, motor 4 is acting as a generator supplying non-critical loads. An alternate configuration would be for motor to rotate unloaded. This configuration would not supply non-critical loads. The hydraulic fluid accumulator or reservoir 18 contains a liquid 19, typically hydraulic oil, pressurized by a gas 20, separated by a diaphragm 21. During the period after loss of normal power and before the combustion engine 15 can provide motive power, normally closed first hydraulic control valve 22 is opened, allowing pressurized liquid to drive rotating members 9 and 10. First hydraulic valve 22 is a solenoid valve selected to be fast acting. Alternate configurations could also employ fast acting pilot or air operated valves. After passing through the hydraulic motor 14, the now unpressurized liquid is collected in sump 23. The amount of fluid stored in accumulator 18 is sufficient to maintain the speed of rotating members 9 and 10 until the combustion engine 15 can provide motive power. The system may include a set of parallel accumulators 18 in order to sustain several minutes of power-drive when delays might be experienced in starting the combustion engine 15. A small electric motor 25, which is actuated after normal power is restored or as soon as the diesel power is available, is used to drive the pump 24 to recharge accumulator 18 with pressurized liquid 19. Normally closed control valve 26 would be opened only during recharge of accumulator 18. As an alternate embodiment, where a second source of long term motive power in the event of failure of the combustion engine 15 is desired, pump 24 can be driven by a second combustion engine instead of motor 25. Second engine 25 would operate pump 24, and the pump would continue to draw unpressurized liquid from sump 23 and return pressurized liquid to accumulator 18, which would rotate the hydraulic motor 14 and members 9 and 10. During primary power outage, second control valve 26 would be replaced by a check valve to prevent backflow or bypass of pressurized liquid during the period prior to pump actuation. In an alternate configuration not requiring a full second source of long term power, the motor 25 would be replaced by a second combustion engine. In this configuration, the check valve 26 would be replaced by a normally closed second control valve.

Combustion engine 15 must also include a supply of fuel and air. In the preferred embodiment, this can be an attachment to the local gas utility supply, with a carburetor. An alternate configuration would include a fuel storage tank, fuel oil pump and a carburetor to mix fuel and air and supply the mixed fluids to the combustion engine.

Figure 3:
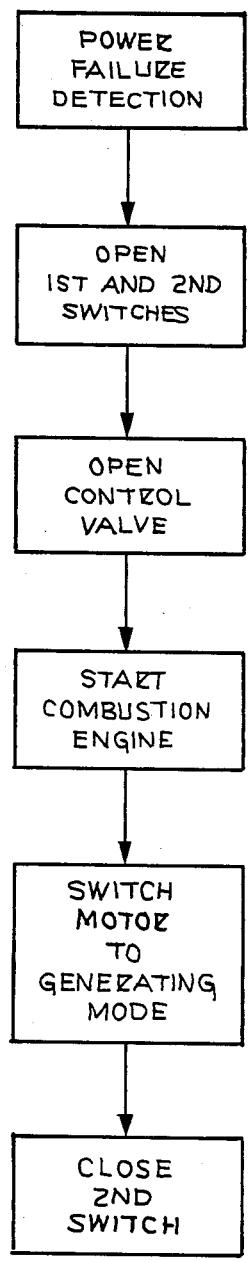
FIG. 3 shows a control system process flow diagram of the uninterruptible power supply during a primary power interruption.

FIG. 3 shows a control system process flow diagram of the uninterruptible power supply during a primary power interruption. The process starts with the motion/distortion of the stator of motor-generator 4 caused by an unacceptable voltage, wave form, phase shift or other power-failure indicating phenomenon. If the distortion/motion goes beyond a predetermined limit indicating an unacceptable primary power failure, the normally closed first and second control switches 3, 5 are open. This cuts power from the non-critical loads allowing further isolation of critical loads. The next process step, which occurs simultaneously with the opening of control switches, is the opening of the hydraulic control valve. This applies hydraulic fluid from the accumulator 18 to the hydraulic motor 14, replacing the motive power previously supplied to the alternator 7 by the motor generator. Simultaneously, a start signal is sent to the combustion engine 15 as a fourth process step. This engine provides long term motive power to the alternator after hydraulic fluid from the accumulator is depleted. Once the combustion engine motive power is established after a time delay, the motor-generator 4 can now be used as a generator to supply the non-critical loads, after second control switch 5 is closed.

Figure 4:
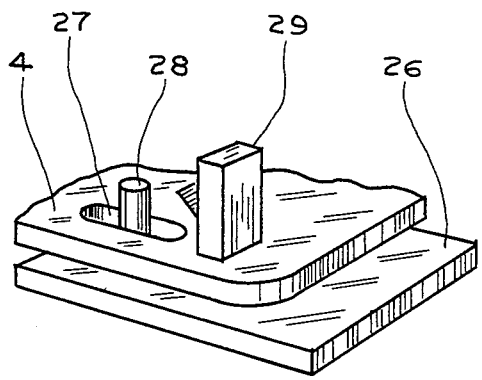
FIG. 4 shows a motion detector in a portion of motor-generator support.

FIG. 4 shows a motion detector on a portion of the motor-generator support. The motor-generator 4 support portion is slidably placed on base plate 26. The motor-generator 4 includes a slot 27 though which a shaft 28, attached to base plate 26, protrudes. Contact switch 29 serves as a sensor of motion, being placed near shaft 28 at a point where it contacts the shaft when motion resulting from unacceptable primary power, typically 1 to 3 centimeters, (reduction in field and reacting forces resulting from inadequate wave form, voltage or phase angle) is applied to the motor-generator.

While the preferred embodiment of the invention has been shown and described, changes and modifications may be made therein within the scope of the appended claims without departing from the spirit and scope of this invention.

What is claimed is:

1. An uninterruptible electric power device, supplying electric power to a critical electric load, which comprises:

a motor-generator having a rotor and a stator;

an alternator having a rotating member attached to said rotor, said alternator supplying electric power to said critical electric load;

means for supplying a primary electric motive power to said motor-generator sufficient to rotate said alternator when said primary electric power is within an acceptable range of properties;

a switch capable of interrupting the primary electric power to said motor-generator;

means for sensing a defect in said primary electric power outside of said acceptable range of properties;

means, responsive to said means for sensing, for actuating said switch, interrupting said primary electric power to said motor-generator;

a fluid driven hydraulic motor engaging and capable of rotating said rotating member of said alternator;

means for supplying pressurized fluid to said hydraulic motor, said fluid supply capable of rotating said hydraulic motor and alternator for a first period of time;

a non-electrically powered engine engaging and capable of rotating said alternator supplying said electrical load for a second period of time longer than said first period; and means for actuating said interrupted switch to the closed position when said primary electric power has returned to within said acceptable limits.

2. The device as claimed in claim 1, wherein said means for sensing comprises:

a mounting support, for said motor-generator, allowing limited motion and distortion of said stator; and means for sensing a specific amount of motion of said stator.

3. The device as claimed in claim 2 which also comprises:

means for switching an elective portion of said load during said second period to said motor-generator;

a clutch allowing disengagement of said hydraulic motor from said generator;

a flywheel shaped and dimensioned to generally maintain the rotational speed of said rotating element during said first period of time; and means for disengaging said clutch during said normal period.

4. The device as claimed in claim 3, wherein said means for supplying primary electric power is a main breaker drawing power from a local utility grid.

5. The device claimed in claim 4, wherein said mounting consists of:

a motor-generator support slidably mounted on a base plate;

a slotted port in said motor-generating support;

a shaft attached to said base plate extending to within said port; and a contact switch positioned on said support to be actuated by a motion of said shaft.

6. The device claimed in claim 5, wherein said means for supplying fluid comprises:

hydraulic oil;

an accumulator capable of storing said hydraulic oil under pressure, said accumulator having an outlet; and a first hydraulic control valve attached to said outlet, said hydraulic valve actuated by said contact switch.

7. The device claimed in claim 6, wherein said means for actuating said uninterrupted switch consists of a manual reset of said switch.

8. The device as claimed in claim 7, wherein said amount of motion is in a range from 1 to 3 cm.

9. The device as claimed in claim 9, wherein said means for actuating comprises:

a source of control electric power;

a solenoid actuator driven by said control power; and a supply of control power interrupted by said contact switch actuation.

10. The device as claimed in claim 9, wherein said mounting also allows limited motion and distortion of said alternator.

11. The device as claimed in claim 10 which also comprises:

a sump for the collection of said fluid discharged from said hydraulic motor;

a hydraulic pump capable of drawing fluid from said sump and discharging pressurized fluid to said accumulator; and a second non-electrically powered engine capable of rotating said hydraulic pump.

12. The device as claimed in claim 10 which also comprises:

a sump for the collection of said fluid discharged from said hydraulic motor, said sump having an outlet;

a second hydraulic control valve attached to the outlet of said sump;

a third hydraulic control valve attached to said outlet of said accumulator;

a hydraulic pump capable of drawing fluid from said second hydraulic control valve and discharging pressurized fluid to a said outlet of said reservoir; and a motor capable of rotating said hydraulic pump.

* * * * *